United States Patent [19]

Brooks et al.

[11] Patent Number: 5,437,329

[45] Date of Patent: Aug. 1, 1995

[54] METHOD AND APPARATUS FOR ACTIVATION OF FURNACE SLAG BASE CEMENT

[75] Inventors: Fred Brooks, Houston; Thomas W. Daves, The Woodlands; William Lang, Spring, all of Tex.

[73] Assignee: Baker Hughes Incorporated, Houston, Tex.

[21] Appl. No.: 186,438

[22] Filed: Jan. 25, 1994

[51] Int. Cl.⁶ ....................... E21B 33/13; E21B 47/00
[52] U.S. Cl. ..................................... 166/250; 166/53; 166/292; 166/293
[58] Field of Search ............... 166/250, 285, 292, 293, 166/53, 75.1, 79; 175/206, 217, 218

[56] References Cited

U.S. PATENT DOCUMENTS

| | | | |
|---|---|---|---|
| 3,603,399 | 9/1971 | Reed | 166/305.1 |
| 3,827,495 | 8/1974 | Reed | 166/250 |
| 3,833,718 | 9/1974 | Reed et al. | 166/305.1 |
| 4,470,727 | 9/1984 | Ritter | 166/305.1 |
| 4,867,256 | 9/1989 | Snead | 175/206 X |
| 4,883,125 | 11/1989 | Wilson et al. | 166/293 X |
| 4,953,618 | 9/1990 | Hamid et al. | 166/250 |
| 4,984,933 | 1/1991 | Annett et al. | 166/293 X |
| 5,058,678 | 10/1991 | Hale et al. | 166/293 |
| 5,213,446 | 5/1993 | Dovan | 175/206 X |
| 5,314,022 | 5/1994 | Cowan et al. | 166/293 |
| 5,327,968 | 7/1994 | Onan et al. | 166/293 |

OTHER PUBLICATIONS

Fred Brooks, W. H. Grant, Jr., *Chapter 4 Primary Cementing*, Worldwide Cementing Practices, First Edition, Jan. 1991.
Halliburton Company, 1994.
K. M. Cowan, "Solidfy mud to save cementing time and reduce waste," *World, Oil*, Oct. 1993, at 43.
Kline, et al., "Evaluation of Cementing Practices by Quantitative Radiotracer Measurements," IADC/SPE 14778, 1986 IADC/SPE Drilling Conference held in Dallas, Tex., Feb. 10-12, 1986.

*Primary Examiner*—George A. Suchfield
*Attorney, Agent, or Firm*—Rosenblatt & Associates

[57] ABSTRACT

The invention provides for metering the pumping rate of BFS/mud mixtures pumped to the cementing head on a rig for sealing off the formation from the casing. Since BFS/mud mixtures require an activation agent, preferably sodium hydroxide is pumped into the flowline to the cementing head. Feedback from the BFS/mud slurry flowrate is fed to the activator injector pump drive system to regulate the addition rate of the activating agent in response to varying conditions, such as mud flowrate. The injection rate target can also be adjusted to compensate for any changes in downhole temperature. The risk of fouling surface equipment and the casing internal diameter is minimized because the activation agent is added very close in time to when the BFS/mud mixture enters the cementing head. Even in situations where the anticipated downhole temperature is significantly lower than the surface temperature, a sufficient amount of activating agent is added for the downhole conditions without fear of fouling the casing internal or the surface pumping equipment.

17 Claims, 1 Drawing Sheet

METHOD AND APPARATUS FOR ACTIVATION OF FURNACE SLAG BASE CEMENT

FIELD OF THE INVENTION

The field of this invention relates to preparation and setting of blast-furnace slag mud formulations into a wellbore to cement a casing.

BACKGROUND OF THE INVENTION

In the past, casing has been cemented downhole using Portland cement-based materials. The Portland cement is mixed with water or available aqueous solution and circulated to properly spot the material for properly sealing off the outside of the casing from the formation. The Portland cementing systems have generally been provided to well operators by oilfield service companies. These service companies have brought to the well site, mixing equipment and personnel so that the Portland cement can be continuously mixed with water to obtain the proper ratio of cement to water for proper solidification on the casing exterior. More recently, an alternative to Portland cement systems has been developed. This system involves the addition of blast-furnace slag (BFS) to water-based mud for slurry densities in the range of between 10–20 lbs./gal., depending on the mud weight and the requirements applicable to the specific operation. The thickening time of BFS/mud mixtures is controlled by activators and retarders. Activators accelerate hydration of BFS and reduce thickening time and improve early compressive strength development. Some of the more effective activators are alkali materials that increase the mud pH. The addition of BFS and activators to mud has negligible effect on the plastic viscosity, yield point, and gel strength over and above the properties of the original mud. The rheological properties can be further adjusted using chemical thinners or deflocculents, dilution of the mud with water, or a combination of both steps.

BFS/mud mixtures can be activated by thermal energy or chemical activation. Chemically, BFS is similar to Portland cement. It is the residue from ore and other additives developed in a molten state, along with iron in a blast furnace. BFS is discharged from a blast furnace at a temperature between 2500°–2900° F. and quenched as a molten slag to produce a glassy, granular material. Optimization of BFS/mud mixtures puts the solids by volume content at anywhere in the range between 16–45% and reasonably approximates the concentrations of equivalent density Portland cement slurries.

BFS is less reactive than Portland cement. As a consequence, BFS/water-based mud mixtures or BFS/water mixtures must be chemically activated to achieve set in the downhole wellbore environment, and Portland cement/water mixtures usually must be chemically retarded. Chemical activation is simpler and less expensive than retardation. Typically, sodium hydroxide and sodium carbonate are the most widely used activators for BFS/water-based mud mixtures because they are commonly available. Sodium hydroxide has a greater impact on setting time, while sodium carbonate has a greater influence on the manner of set and the compressive strength. Above 80° F., sodium carbonate is used in greater concentrations than sodium hydroxide because there is sufficient thermal energy to reduce setting times, while the higher sodium carbonate concentration aids in the early compressive strength development. In temperatures below 80° F., the sodium hydroxide concentration can be equal or slightly higher than sodium carbonate concentration because of low thermal energy available to activate the slag hydration. Typically, activator concentration in the formulations varies between 2–24 lbs./barrel of slurry for most formulations, depending on the temperature and the amount of retarding material present. Yet another advantage of using BFS/mud mixtures is uniform compressive strength build-up over time in situations where significant temperature differentials exist between top and bottomhole temperatures.

When using BFS/mud mixtures in the field, the BFS is typically mixed with the mud in the mud pits on the rig. Batch mixing in rig pits or mud premix tanks or cement mixers is possible. In some instances, this has required isolation of mud to be used for batch mixing with the BFS. Testing is then separately done on samples of the mixture. Upon completion of the testing, activators, dispersants or other additives were added to the isolated fluid. This was usually done prior to cementing. Use of this procedure involved several operational considerations which could adversely affect the rig equipment and/or the success of the primary cement job. The possible problems all arise from the potential for premature set of the slag-mix slurry, if all of the components are added to the mix mud before the cementing operation is initiated. Generally, according to API procedures, BFS is less abrasive than barite and, therefore, undue wear on pumps and other equipment is not a major problem. In the past, however, concerns about early set-up of the BFS/mud mixture in the surface equipment has been an impediment to successful cementing, especially where there are substantial thermal differences between ambient temperatures at the surface, where the activator is added, and bottomhole temperature, where the activator is to perform. Normally, BFS/mud mixtures were designed to have sufficient thickening time at the downhole temperature to allow slurry placement. In many situations where the downhole temperature exceeds the surface temperature, the mixture thickening time is longer on the surface. This leaves ample time to flush the lines and other surface equipment of residual fluid before it sets. However, in deepwater applications, the slurry surface temperature may be higher than the bottomhole circulating temperature. Therefore, slurries designed at the surface for lower bottomhole temperatures will set faster on the surface. In the past, this has required a dedicated line from the mixing tank to the rig pumps to minimize contamination of surface equipment. Additionally, due to flow variability upon pumping of the BFS/cement slurry, fine tuning of the amount of activator was necessary to account for variations in flowrates, as well as any bottomhole temperature variations. If the batch was premixed in the mud pits, there would be no opportunity to control the rate of addition of activator to the batch blend. Additionally, batch mixing presented uniformity problems as well as the potential that the batch could solidify if pumping problems developed.

In the past, radio tracer injection techniques have been used to facilitate foot-by-foot measurements of Portland cement coverage behind a casing. The principle used was injection of a uniform tracer material with a short half-life to allow measurement of cement placement, mud displacement, and the mixing that takes place at displacement fronts. The injection technique for the radioactive material is illustrated in FIG. 1 of IADC/SPE Paper 14778 entitled "Evaluation of Cementing Practices by Quantitative Radio Tracer Measurements," authored by Kline, et al., delivered in 1986 at the IADC/SPE Conference in Dallas, Tex.

The system illustrated in FIG. 1 has many advantages over the prior techniques which have been used to add activator to the BFS/mud slurry. The apparatus and method illustrated in FIG. 1 deal with the possible risks to rig equipment and the success of the primary cement job, for which no answers were available in the referenced 1993 article by Cowan, the inventor of U.S. Pat. No. 5,058,679, which is discussed in the detailed description below. One of the concerns to the well operator is if attempts are made to continuously mix the activator with the BFS/mud slurry, the operator was required to call out a cementing service company who would bring, at great expense, continuous mixing equipment previously used for Portland cement-based systems to conduct the inline mixing of the BFS with the mud. In order to save rig time and expense, ideas began to develop about using the rig equipment for mixing the BFS with the mud. The economic incentive was to avoid the cost associated with hiring a service company for the mixing operation and to minimize rig time due to delays which could ensue from such an operation with a cementing service company. However, as pointed out by Cowan, the risks of batch mixing in the rig pits and adding a precise amount of activator for the expected downhole conditions created certain risks. For example, where the subsurface temperatures were significantly lower than the surface temperatures, additional activator would have to be added to allow for the lower temperature downhole. However, this would shorten the set-up time for the BFS/mud slurry and create operational problems if the slurry, once activated, was not quickly placed downhole where the expected lower temperature would be encountered. Those skilled in the art appreciated that the pumping of the BFS/mud slurry is not a continuous operation at a smooth flowrate. Upon initial presentation into the casing internals, the mud "free falls" until the casing internals are filled and the mud starts its progress outside of the casing adjacent the formation. At that point, fluid losses could occur due to washouts or high porous segments, as well as resistance to flow can occur, all of which act to put additional resistance on the surface pumping equipment, which in turn induces the rig personnel to alter the operation of the surface pumps to avoid exceeding a predetermined pressure. This results in a slowing down of the flowrate, which in turn can cause problems if a large batch has been mixed in the rig equipment and activator already added. Continuous addition of activator on a real-time basis to reflect the actual operating flowrates directly compensates for flow fluctuations while at the same time minimizing the time between activator injection and final placement. In essence, as soon as the activator is added, the mud is pumped through the cementing head and toward its final destination. If for any reason there is a flow interruption, the surface equipment is essentially free of activated BFS/mud slurry.

Accordingly, the apparatus and method of the present invention have been developed to improve on the systems for activator addition to BFS/mud mixtures. The present invention allows for sensitivity to changing flowrates and pressure conditions downhole during the placement of the BFS/mud mixture. The method of addition also minimizes the risk of line plugging when using surface mud circulating equipment. The activator concentration can be adjusted on a real-time basis and precisely added for the expected downhole temperatures to be encountered, while at the same time minimizing the risk of fouling surface equipment or the inside of the casing.

SUMMARY OF THE INVENTION

The invention provides for metering the pumping rate of BFS/mud mixtures pumped to the cementing head on a rig for sealing off the formation from the casing. Since BFS/mud mixtures require an activation agent, preferably sodium hydroxide is pumped into the flowline to the cementing head. Feedback from the BFS/mud slurry flowrate is fed to the activator injector pump drive system to regulate the addition rate of the activating agent in response to varying conditions, such as mud flowrate. The injection rate target can also be adjusted to compensate for any changes in downhole temperature. The risk of fouling surface equipment and the casing internal diameter is minimized because the activation agent is added very close in time to when the BFS/mud mixture enters the cementing head. Even in situations where the anticipated downhole temperature is significantly lower than the surface temperature, a sufficient amount of activating agent is added for the downhole conditions without fear of fouling the casing internal or the surface pumping equipment.

DETAILED DESCRIPTION OF THE PREFERRED EMBODIMENT

Figure 1:
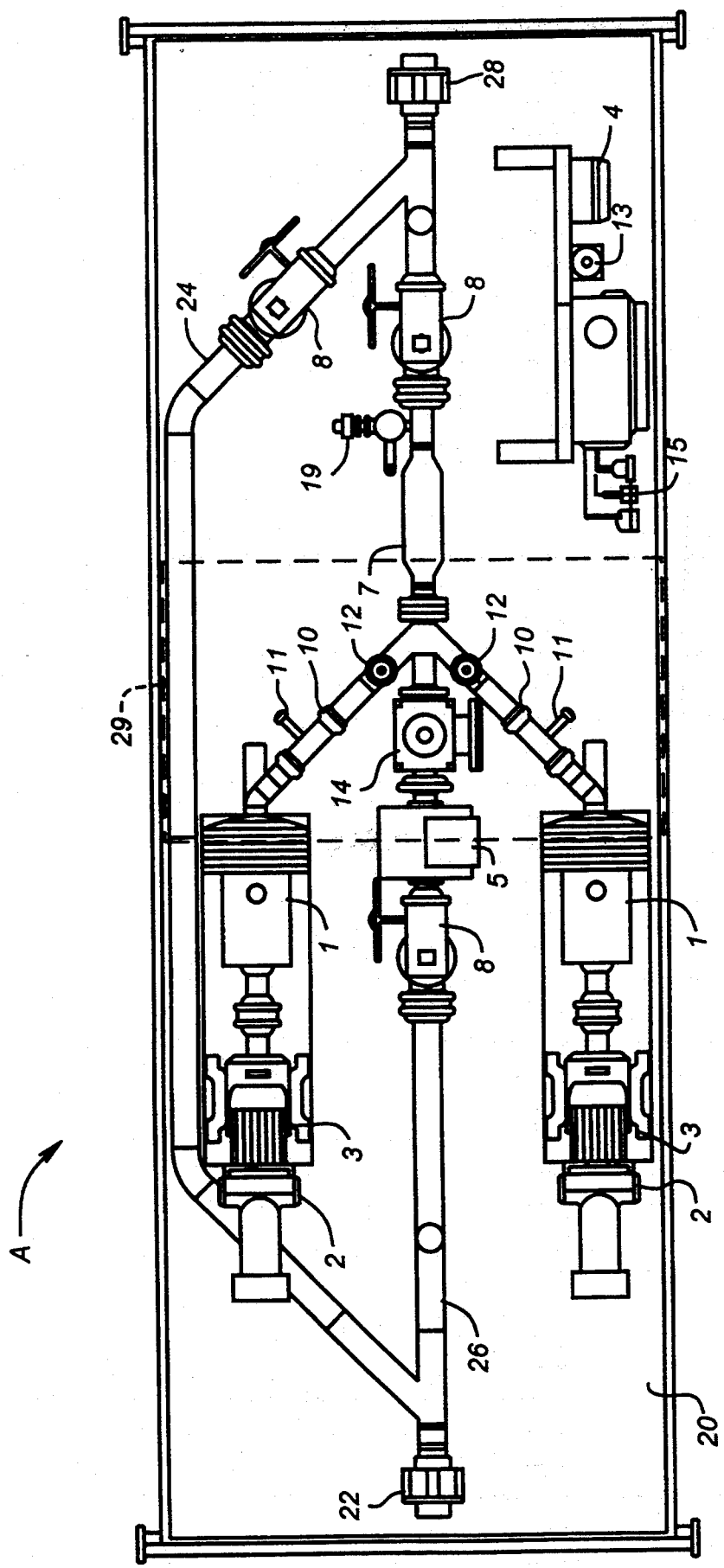
FIG. 1 is a plan view of a skid-mounted assembly illustrating the preferred embodiment of the present invention.

As previously stated, traditionally, Portland cement slurried in water has been used as the solidifying agent for sealing off the casing from the formation and to provide mechanical support for the casing. More recently, to replace the Portland cement-based systems, a technique has been developed to use blast furnace slag as the solidifying agent for water-based mud. This procedure is illustrated in U.S. Pat. No. 5,058,679. Typically, these BFS/mud systems require an activation agent to begin the hardening process. Sodium hydroxide and/or sodium carbonate have proven to be effective activating agents for the BFS/mud mixtures. In the preferred embodiment of the present invention, sodium hydroxide 25–50% by weight solution will be used, depending on local weatyher conditions. The apparatus and method of the present invention constitute an improvement over the prior batch systems used for BFS/mud mixtures. As discussed in a recent article appearing in the October 1993 issue of *World Oil*, entitled "Solidify Mud to Save Cementing Time and Reduce Waste," by K. M. Cowan (also the patentee of U.S. Pat. No. 5,058,796), the prior method of adding activators into a batch mix tank, such as the mud tanks, presented numerous problems with plugging of rig equipment or potentially the casing, particularly if the ambient temperature at the surface where the batch is mixed is substantially higher than the bottomhole temperature. This type of temperature gradient is encountered in offshore wells in deepwater locations. The article concludes that the present technology still makes it difficult to implement the BFS/mud system using exclusively the rig equipment, particularly the active circulating system on the rig. The apparatus and method of the present invention has very simply answered the inquiry made by Mr. Cowan in the article.

The apparatus A of the present invention is illustrated in FIG. 1. In the preferred embodiment, a skid 20 is used to facilitate portability of the significant pieces of equipment involved. On top of skid 20 is BFS/mud inlet 22. The rig pumps (not shown) are used to supply the BFS/mud mixture which has yet to be activated from the mud pits or other rig equipment to the skid 20. Inlet 22 is connected to meter 5 through line 26 which can be isolated using valves 8. Meter 5 is preferably a magnetic flow meter which is capable of handling slurries. For economy, the meter 5 working pressure may be fairly low in the order of about 1000 pounds. However, to avoid over pressure of meter 5, a relief valve 14 can be provided which can be set preferably at or near the working pressure of the meter 5. Downstream of relief valve 14 is inline mixer 7. Between inline mixer 7 and relief valve 14 are connections for activation pumps 1. Two pumps are illustrated on skid 20 which can be operated in unison or with one operating as a backup unit. In the preferred embodiment, an explosion-proof motor 3 is connected to a variable speed motor reducer which in the preferred embodiment can reduce the pump speed with respect to the motor speed by a ratio of approximately 6–1. The speed reducer 2 can vary the ratio to alter the operating speed of the pump 1 responsive to signals received from control panel 15. A source of activation material, preferably 50% caustic soda solution, is connected to the inlets as marked on FIG. 1. Each of the pumps 1 discharge past a bleed valve 11 followed by a block valve 10 and finally a check valve 12. As indicated in FIG. 1, the discharge of pump 1 has an outlet to a pressure switch with the switch 13 mounted on a panel. The pressure switch is electrically tied to motor 3 for shutdown in the event of sudden loss of pressure during operation which would signal a serious leakage of caustic soda. Due to the safety concerns, a rapid shutdown of the caustic supply is desirable in the event of a catastrophic leak. Both the pumps 1 on the skid 20 are similarly equipped.

Downstream of inline mixer 7 which mixes the BFS/mud slurry arriving from inlet 22 with the caustic soda coming from pump 1 is a sample port assembly 19 which allows monitoring personnel to obtain a sample of the activated BFS/mud mixture. Block valves 8 on line 26 allow isolation of the meter 5, relief valve 14, and inline mixer 7. With valves 8 which are disposed upstream of meter 5 and downstream of sample port assembly 19 both closed and a bypass valve 8 on line 24 open, the entire skid 20 operates as essentially as a piece of pipe. During normal operation when caustic soda is added, the valves 8 on line 26 are in the open position while the block valve 8 on the bypass line 24 is closed. The mixture of caustic soda with the BFS/mud slurry exits from outlet 28 and goes to a cementing head (not shown) for pumping down the casing and around the outside of the casing in the normal manner for a cementing operation. The BFS/mud flowrate is indicated on flow indicator controller 4. The flow indicator 4 sends a signal into the electrical control panel 15. Within the panel, in a manner known in the art, the signal from the flow indicator controller 4 is used to generate a signal directed to the variable speed drive 2 to alter the speed of the pump. In the preferred embodiment, the pump 1 is of a positive displacement type where its volume delivery is directly proportional to its operating speed.

In operation, the rig pumps (not shown) are oriented for flow communication with inlet 22 with the block valve 8 on the bypass line 24 closed. Flow through meter 5 creates a signal on controller 4 which in turn regulates pump 1 at a particular speed through manipulation of variable speed drive 2. In this manner, a predetermined addition rate, as determined on control panel 15, of caustic soda is attained by regulating the speed of pump 1 to the flowrate measured on meter 5. Knowing the properties of the BFS/mud slurry mixture coming into inlet 22, the desired rate of addition of caustic soda can be readily determined since the properties of caustic soda are as well also known. The mixture is thoroughly mixed in inline mixer 7 and then exits the skid 20 through outlet 28. It then flows to the cementing head (not shown) down the casing and around the outside of the casing for ultimate cementing between the casing and the formation. It is anticipated that the addition of caustic soda occurs when flow of BFS/mud slurry is initiated. The addition continues at a rate proportional to the flow. During the initial pumping, the BFS/mud mixture, which has just been activated on skid 20, flows generally smoothly until the BFS/mud mixture reaches the bottom of the casing. Thereafter, fluctuations in the flowrate may occur due to resistance to flow offered by the formation around the outside of the casing. Variations in flowrate which occur when rig personnel alter the speed of the rig pumps to avoid increasing pressure beyond a predetermined value are automatically accounted for at the surface by adjustments to the flowrate of caustic soda at pump 1 through the controller 15 acting on a signal received from flowmeter 5. Conveniently, by the time the activated BFS/mud mixture reaches the bottom of the wellbore to come around the casing and go up the casing, most, if not all, of the caustic soda which is necessary for subsequent hardening of the mixture has already been added. Once that point is reached, the pumps 1 are turned off and blocked in and the skid 20 is operated on bypass line 24 by opening the bypass 8 on line 24 and closing the two inline valves 8 on line 26. At this time, a pressure buildup is usually experienced at the rig pump as the BFS/mud mixture is forced upwardly outside the casing adjacent the formation. Since the pressure rating of the meter 5 is only 1000 pounds, it can be effectively blocked in casing valves 8 on line 26 once the condition has occurred where no additional caustic soda is required.

The illustrated system disclosed in FIG. 1 and described above has several advantages. First, it is a compact design which can be used for both onshore and offshore applications. In locations where space is commonly at a premium, a compact design is often helpful. The present invention allows the use of rig pumps and equipment to mix the BFS/mud slurry without fear that the lines will set up if the pumping procedure is interrupted after a batch activation. Batch activation in mud pits or other equipment can present serious concerns of plugging the important rig equipment if pumping problems are encountered after activation. With apparatus A of the present invention, there is no activation until the slurry is about to enter the cementing head. If pumping problems develop, the activated inventory in the surface equipment is negligible.

Variations in the pumping rate are measured by the apparatus of the present invention and real time corrections to the caustic soda addition rate are made in response to such flow fluctuations of the BFS/mud slurry. The system can be entirely isolated once a sufficient amount of caustic soda has been added to the charge of BFS/mud slurry which is to be used in the cementing procedure. Typically, the rig location has a mud engineer whose principal responsibilities are the physical properties of the mud during the drilling operation. The apparatus of the present invention allows the use of the same mud engineer or even rig personnel to monitor the performance. Accordingly, with the compact design of the skid 20, the skid can be made a permanent part of the rig equipment and no incremental personnel are necessary beyond a mud engineer who would be on location in any event during the drilling operation for monitoring of the mud properties. In short, the apparatus and method of the present invention takes the fear out of batch mixing BFS/mud slurries using existing rig equipment. It also provides a greater degree of control and certainty over the consistency and uniformity of concentration of activating caustic soda in the mixture. Since the caustic soda is mixed inline with the flowing BFS/mud mixture, a more uniform consistency can be obtained as opposed to batch mixing in large tanks where the consistency of the permeation of caustic soda within the BFS/mud mixture is unknown or at best uncertain. By continuously adding the caustic soda, the operator is assured of a more consistent hardening of the BFS/mud mixture throughout the zone being cemented.

For added safety, a housing 29 shown in dashed lines can be put over meter 5 and relief valve 14, as well as most of the discharge piping from pump 1 so that in the event any leaks develop, personnel on the rig are protected from burns which could occur from skin contact with 50% caustic soda.

It should be noted that other percentages of caustic soda can be used without departing from the spirit of the invention. Other activators can be used at different concentrations without departing from the spirit of the invention. The proportionality between the measured flowrate and the speed of the pump 1 can be changed to accommodate different concentrations of activator in the BFS/mud slurry or, alternatively, to accommodate different concentrations of activator solutions used so that the ultimate concentration of activator in the finished mixed slurry is in the proper range requirement. The BFS concentration in the mud can also be taken into account when computing the amount of actuator to be added. This is usually determined before a batch of BFS is mixed with the mud in the rig equipment.

Although batch mixing facilitates use of rig mud equipment, continuous BFS/mud mixing is also within the scope of the invention. The desired concentration of BFS in the mud is continuously obtained and the feed rate of BFS is then measured. The activator is then injected continuously in proportion to the BFS feed rate. In this manner, as soon as the BFS/mud mixture is prepared, it is immediately activated and sent directly downhole for placement prior to any risk of set-up. If pumping problems develop, the surface equipment can easily be cleaned out without risk of plugging or set-up.

The advantages of use of the system as described and shown in FIG. 1 allow the rig operator to eliminate the use of a cementing service company with its necessary equipment for the mixing operation. By the use of a simple skid-mounted assembly as shown in FIG. 1, the cementing procedure using BFS/mud slurries can be carried out using rig personnel who can manually or with the aid of rig equipment batch mix the BFS slurry with the mud without the addition of caustic. With the use of the apparatus and method of the present invention, the caustic is only added at the last minute before the BFS/mud slurry goes downhole.

While mixing of two or more fluids inline has been accomplished in the past, such as, for example, in U.S. Pat. Nos. 3,833,718 and 3,827,495, ever since the technology of using BFS/mud solutions has evolved as described in U.S. Pat. No. 5,058,679 and the *World Oil* article by its inventor Cowan, operators have been struggling with a reliable method that addresses the risks to rig equipment, particularly in applications where the downhole temperature is significantly below the surface temperatures when a batch is mixed with an activating agent. Temperature gradients of 40° F. are possible which require higher actuator concentrations which in turn can limit the time before substantial hardening at surface temperatures to only a few hours. This can be a significant problem for rig operations if any problems develop during the injection procedure for the BFS/mud slurry after it has been activated. Disposal of the activated slurry may be a problem especially in an offshore environment. The apparatus and method of the present invention address and solve this problem.

The foregoing disclosure and description of the invention are illustrative and explanatory thereof, and various changes in the size, shape and materials, as well as in the details of the illustrated construction, may be made without departing from the spirit of the invention.

We claim:

1. A method of preparation of formulations for cementing a wellbore, comprising:
    mixing drilling mud with blast furnace slag (BFS) in rig equipment normally used for mud circulation during drilling;
    pumping the mixture of mud and BFS into the wellbore; and
    injecting activator inline into the BFS/mud mixture before it enters the wellbore.

2. The method of claim 1, further comprising the steps of:
    measuring the BFS/mud flowrate;
    creating a signal based on said measuring; and
    controlling the flow of injected activator based on said measuring.

3. The method of claim 2, wherein said injecting step further comprises:
    pumping the activator into the BFS/mud mixture adjacent an inline mixer.

4. The method of claim 2, further comprising the steps of:
    using a controller to convert the measured signal relating to BFS/mud flowrate into an output signal; and
    using said output signal to regulate delivery of said activator.

5. The method of claim 4, further comprising the step of:
    using a positive displacement pump to deliver the activator.

6. The method of claim 5, further comprising the steps of:
    providing a variable speed drive on said positive displacement pump; and
    using said output signal from said controller to regulate said variable speed drive.

7. The method of claim 6, further comprising the step of:

setting said controller to regulate delivery of activator material, in solution, in proportion to the rate of BFS flowing with the mud.

8. The method of claim 3, further comprising:
skid mounting said activator pump, said variable speed drive, said mixer, said controller, and interconnecting signal lines for compactness when used on a drilling rig.

9. A method of preparation of formulations for cementing a wellbore, comprising:
mixing drilling mud with blast furnace slag (BFS) in rig equipment normally used for mud circulation during drilling;
pumping the mixture of mud and BFS into the wellbore;
injecting activator inline into the BFS/mud mixture before it enters the wellbore;
measuring the BFS/mud flowrate;
creating a signal based on said measuring;
controlling the flow of injected activator based on said measuring;
pumping the activator into the BFS/mud mixture adjacent an inline mixer;
skid mounting said activator pump, said variable speed drive, said mixer, said controller, and interconnecting signal lines for compactness when based on a drilling rig; and
providing a bypass on said skid to allow fluid to pass through said skid while isolating activator from the BFS/mud flow line.

10. The method of claim 9, further comprising the step of:
using a liquid activator.

11. A method of cementing a wellbore, comprising:
mixing blast furnace slag with drilling mud at the surface;
pumping as yet unactivated BFS/mud mixture toward the wellbore; and
injecting an activator inline into the flowing BFS/mud mixture shortly before it enters the wellbore.

12. The method of claim 11, further comprising the steps of:
measuring the BFS/mud flowrate;
regulating the activator feed rate; and
obtaining a targeted activator concentration.

13. The method of claim 12, further comprising the steps of:
using a positive displacement pump to feed the activator;
supplying a variable speed drive to drive said pump;
adjusting the pump drive rate with said variable speed drive in response to a signal resulting from measurement of said BFS/mud flowrate.

14. A method of cementing a wellbore, comprising the steps of:
continuously mixing BFS into drilling mud to a predetermined value;
continuously adding inline an activator to a predetermined proportion of BFS in the mud.

15. The method of claim 14, further comprising the steps of:
using a pump to add activator into a BFS/mud flowline;
regulating pump output in relation to measured BFS addition rate in the mud.

16. The method of claim 15, further comprising:
using an inline mixer to mix the activator with the BFS/mud mixture.

17. A method of cementing a wellbore, comprising the steps of:
continuously mixing BFS into drilling mud to a predetermined value;
continuously adding inline an activator to a predetermined proportion of BFS in the mud;
using a pump to add activator into a BFS/mud flowline;
regulating pump output in relation to measured BFS addition rate in the mud;
using a variable speed drive on said pump;
adjusting pump output responsive to BFS addition rate in flowing BFS/mud mixture by varying pump speed with said variable speed drive.

* * * * *